(No Model.) 6 Sheets—Sheet 1.
W. C. HAWKINS.
CALENDAR.

No. 475,501. Patented May 24, 1892.

Witnesses: Inventor:
W. C. Hawkins (No Model.) 6 Sheets—Sheet 2.

W. C. HAWKINS.
CALENDAR.

No. 475,501. Patented May 24, 1892.

Witnesses:
Francis P. Reilly
Alex. Scott

Inventor:
W. C. Hawkins
by R. M. Voorhees
Atty

(No Model.)  
6 Sheets—Sheet 3.

W. C. HAWKINS.
CALENDAR.

No. 475,501. Patented May 24, 1892.

(No Model.) 6 Sheets—Sheet 4.
W. C. HAWKINS.
CALENDAR.

No. 475,501. Patented May 24, 1892.

Witnesses:
Francis T. Reilly
Alex. Scott

Inventor:
W. C. Hawkins
by P. H. Vorhees
Atty (No Model.) 6 Sheets—Sheet 5.
W. C. HAWKINS.
CALENDAR.

No. 475,501. Patented May 24, 1892.

Witnesses: Inventor:

THE NORRIS PETERS CO., PHOTO-LITHO., WASHINGTON, D. C.

(No Model.) 6 Sheets—Sheet 6.

W. C. HAWKINS.
CALENDAR.

No. 475,501. Patented May 24, 1892.

Witnesses:
Francis P. Reilly
Alvy Scott

Inventor:
W. C. Hawkins
by P. M. Voorhees
Atty

UNITED STATES PATENT OFFICE.

WILLIAM C. HAWKINS, OF TAUNTON, MASSACHUSETTS.

CALENDAR.

SPECIFICATION forming part of Letters Patent No. 475,501, dated May 24, 1892.

Application filed April 4, 1891. Serial No. 387,711. (No model.)

*To all whom it may concern:*

Be it known that I, WILLIAM C. HAWKINS, of Taunton, in the county of Bristol and State of Massachusetts, have invented a new and useful Calendar, which invention is fully set forth and illustrated in the following specification and accompanying drawings.

The object of this invention is to provide a calendar of cheap construction by means of which any month in the year may be consulted at pleasure and which, by simple modifications, will be serviceable for a series of years.

It is also the object to provide a calendar which may be adapted to various articles of use or ornament while serving the above-mentioned purposes.

The invention is hereinafter described in detail, as follows:

In the accompanying drawings.

In all the edge views the various thicknesses of material of which the date slips or slides and other parts are made are shown more separated than would obtain in practice, the more clearly to exhibit the arrangement of parts, except in Figs. 38 and 40, in which the thickness of material is shown between two lines, it being understood that in practice the various parts lie close upon one another.

The invention consists, essentially, in the construction of a table of date-numbers, as illustrated in Figs. 11 to 15, arranged in thirteen short columns or rows vertically in such order that any seven of the thirteen columns or rows will contain all the days of a month in the regular order required for a calendar, and in combining with such a table in several ways, as hereinafter described, a series of seven groups of months, the months in each group being those whose dates fall upon the same day of the week, and a horizontal column or row of names, initials, or abbreviations of names of the days of the week, the seven-month groups and the abbreviations or names of the days of the week being placed in line with any contiguous seven of the vertical columns of date-numbers in the date-slip.

It is obvious that as there are but seven days of the week every month must have the first day, for instance, or any given day fall on one of these seven days, and as there are twelve months some two or more must have the same grouping of date-numbers with reference to the days of the week. Thus the months may be put singly or in groups of two or three in seven places, corresponding to the seven days of the week and the corresponding seven columns of date-numbers, and if the grouping of the date-numbers is such that the first of the month may be placed under either one of the days of the week and at the same time expose to view only the whole thirty-one days of a month in proper order at each of seven positions the calendar may be set by one movement of the slip containing the date-grouping for any month of the year.

Figure 11:
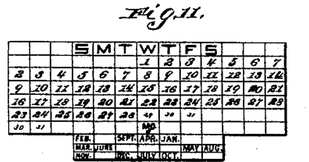
Figs. 11 to 14, inclusive, are diagrams showing the several plans of grouping the date-numbers and the months.

In the diagram, Fig. 11, which is the preferable arrangement of date-grouping, the first of the month is placed at the top of the central date-column and the numbers increase downward in the column by sevens. From this central column, passing to the right, the numbers increase in any horizontal line by one, and similarly to the left diminish by one, so that with any seven vertical columns exposed to view cutting off any right-hand column brings into view the same numbers in a column at the left, but placed one line lower in the column—that is to say, any seven of the thirteen columns taken will contain all the date-numbers from 1 to 31 in the usual order required for a calendar. With this construction of date-table, if the months be grouped in seven corresponding groups, as in Fig. 11, and the date-table be moved with reference to the month-groups, while the names or abbreviations of names of the days of the week remain fixed in line with the month-groups, with the central date-column brought opposite the group marked "Apr., July," for example, the seven date-columns in line with the days of the week will contain all the days in the proper order for those months. If now the date-slip be moved until the central date-column is in line with the month-group marked "Aug.," three of the date-columns at the right will be cut off from view and a corresponding number of columns will appear at the left, and the first of the month will fall on Saturday, as it should for that month in the year 1891, and all the other dates will appear in the proper order and under the proper day of the week and similarly for any of the twelve months or seven possible positions of the date-slip with reference to the fixed days of the week and month groups. In thus moving the date-slip with reference to the days of the week and the month-groups it is understood that only the seven date-columns falling in line with the latter are exposed to view, the other six columns being hidden from view, as hereinafter explained in the several constructions of the calendar shown.

Figure 12:
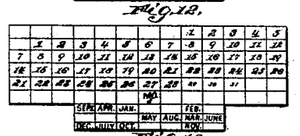
Figure 13:
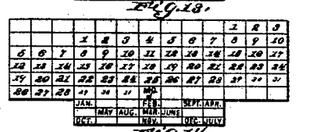

The letters "Mo. of" in Figs. 11, 12, and 13 are placed in the central column of the date-table as indicating that this column is to be placed in line with the month required, and any suitable pointer or index may be used for that purpose.

Figure 14:
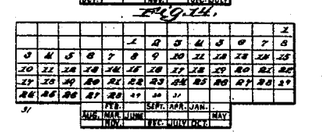

Figs. 12, 13, and 14 show different groupings of the dates upon the same general plan, varied only by making the first of the month fall upon different columns, and there are seven different groupings which may be used upon the same principle, having either of the days from the 1st to the 7th at the top of the central column, and either of these groupings may be used; but the grouping shown in Fig. 11 is preferable, for the reason that the date "1," coming at the head of the central column, serves as a convenient index to place in line with the required month group in the absence of any other pointer, and this date-grouping will be adopted in all the succeeding figures. Thus Fig. 12 places the 6th of the month at the head of the central or index column, Fig. 13 the 4th, and Fig. 14 the 2d of the month. The date-grouping in Fig. 11 is also most convenient as allowing space on the lower horizontal line of dates in which to place any desired index or pointer; but Fig. 14 is objectionable as requiring one more horizontal line of numbers at the bottom than either of the others, as indicated by the number 31, placed outside of the lower left-hand corner. If the grouping of the date-table is varied as above explained, the month-groupings must be varied to correspond, as shown in Figs. 12, 13, and 14, these month-groupings being all for the year 1891. Thus when the date-table is grouped as in Fig. 12 the month of May comes in the center group of months, in Fig. 13 the months of February, March, and November, and in Fig. 14 the months of September and December.

Figure 15:
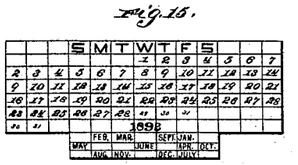
Figs. 15 to 19, inclusive, show the grouping of the months for several years for one grouping of the date-numbers.
Figure 16:
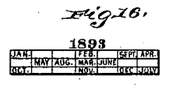
Figure 17:
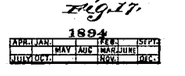
Figure 18:
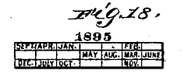
Figure 19:
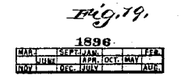

The month-grouping for either of the seven date-groupings possible for a given year upon this plan, as above explained, will also change for every year. Thus Fig. 15 shows the preferable date-grouping for the year 1891, the same as Fig. 11, with the corresponding month-grouping for the year 1892; Fig. 16, similar month-grouping for 1893, Fig. 17 for 1894, Fig. 18 for 1895, and Fig. 19 for 1896. In these month-groups it will be observed that 1891, 1893, 1894, and 1895 not being leap years the groupings are identical, their positions with reference to the days of the week changing one place to the right for each year between two leap-years only, while 1892 and 1896 being leap-years the groups themselves change, but are the same for both leap-years, differently placed.

With the above explanation as to the principle upon which the invention is based the following description will exhibit its practical application in a series of simple, cheap calendars, requiring but one movement to change from month to month, and similarly but one operation to change from year to year for as many years as it may be designed for, if for more than one year. In most of the forms shown, however, it is preferable to make the calendar to serve for but one year, in view of the great cheapness with which in such forms it may be produced, being constructed in such cases of paper and card-board only.

In Figs. 1 to 4, inclusive, the number 1 indicates the card base or mount on which the calendar-table is mounted, having a rectangular opening 3 cut in it of proper dimensions to exhibit a view seven only of the vertical date-columns of the date-slip 2 placed behind it. Pasted or otherwise secured to the card 1 on the back is an H-shaped piece of stiff paper 5. Secured to the end of the date-slip 2 on the back are two card-board projections 6 with which to move said slip or slide and to form guides for it against the edges of the recesses cut in the H-shaped paper-backing 5. Upon the face of the card 1 is displayed the year in any desired position, on the top adjoining the opening 3 the horizontal row of initials of the days of the week, and adjoining the bottom of the opening 3 the month-groups to correspond. At the foot of the central date-column of the date-slide is placed the abbreviation "Mo." to indicate that this column is to be placed over the month in use; but this may consist of any suitable pointer or index. In this construction it is obvious that the position of the week-day initials and the month-groups may be reversed, the latter being placed at the top and the former at the bottom, or both be placed at the top or bottom, without departing from the gist of this invention. It is also obvious that by superimposing slips containing each a series of month-groups similar to that shown at 10 in Figs. 20 and 21 or by other means of multiplication of the month-group series this calendar may be made to serve for as many years as there are month-group series provided.

Figure 1:
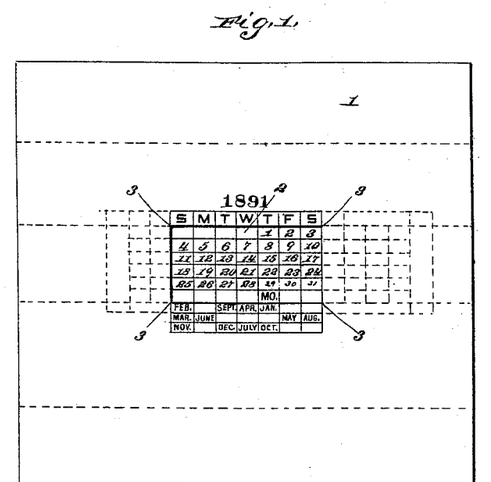
Figure 1 is a face view of a calendar in one of the forms embodying this invention, as hereinafter described.
Figure 2:
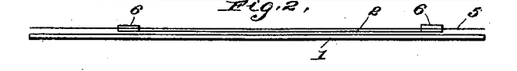
Fig. 2 is an end view, Fig. 3 a back view, and Fig. 4 a side view, of Fig. 1.
Figure 3:
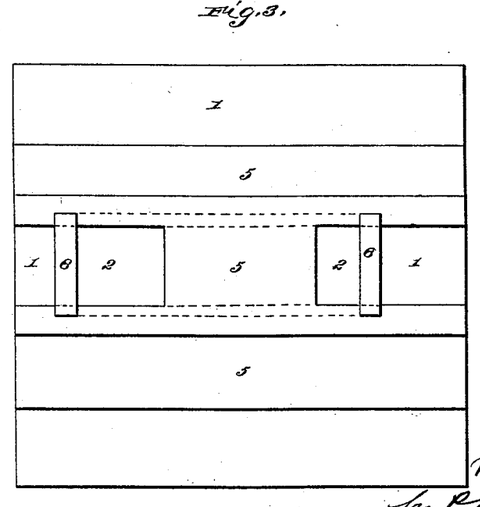
Figure 4:
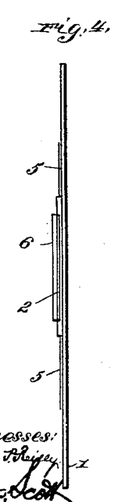
Figure 5:
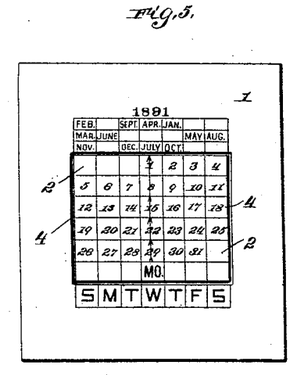
Fig. 5 is a face view, Fig. 6 an end view, and Fig. 7 a back view, of a second form into which the invention may be put.
Figure 6:
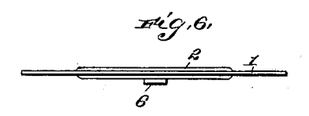
Figure 7:
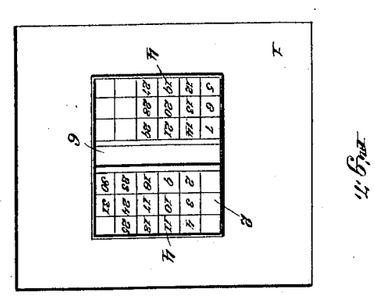

In Figs. 5, 6, and 7 the number 1 indicates the card or mount, having instead of a rectangular opening, as in Fig. 1, two parallel narrow vertical slots 4 cut therein, and having printed or otherwise displayed on its face the year, at the top adjoining the upper ends of the slots 4 the seven month-groups, and at the bottom the initials of the days of the week. The number 2 indicates the date-slip, arranged to pass through the slots 4, meet and be secured together at the back, thus forming an endless web, which may be slid around through said slots. A piece of card-board or other suitable material 6 is secured to the date-slip 2 at the back, forming a projection by means of which said slip may be moved, and to serve as a stop to limit its motion in either direction upon arrival at either of the slots 4. The abbreviation "Mo." has an arrow or pointer in the middle column of dates pointing to the months above, as shown. It is obvious that in this construction those parts of the card 1 which form the outer vertical margins beyond the slots 4 may be dispensed with and the web or slide be made to run on the outer edges of the card, which may be notched or recessed only sufficient to keep the web in place vertically, and thus the entire width of the card be utilized for the display of the dates for one month. In this construction the month-group series may also be multiplied by being superimposed on the card, as in Figs. 20 and 21, or otherwise supplied and attached to the card or mount.

Figure 8:
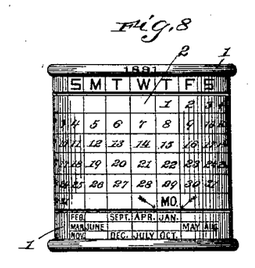
Figs. 8, 9, and 10 are respectively a front elevation, a vertical section, and a top view showing the application of the invention to a circular cup or receptacle, such as may be used for holding pens, wafers, pins, or other articles in common use upon the ordinary desk.
Figure 9:
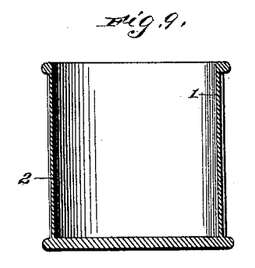
Figure 10:
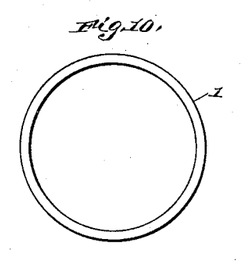

In Figs. 8, 9, and 10 the date-slip 2 is made endless and surrounding a circular receptacle 1, the week-day initials being displayed on the latter at the top and the month-groups at the bottom. In this form it may be adapted to a great variety of articles of use or ornament.

Figure 30:
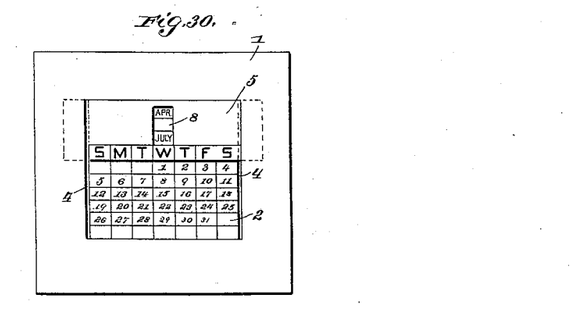
Figs. 30 and 31 are respectively a face and end view of a preferable cheap construction hereinafter described.
Figure 31:
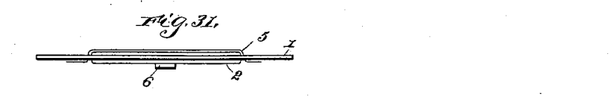
Figure 32:
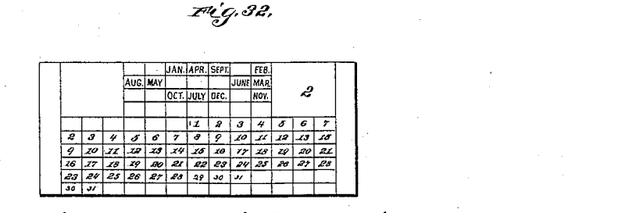
Fig. 32 is a diagram of the combined grouping of the dates and months on the slip for the same.
Figure 33:
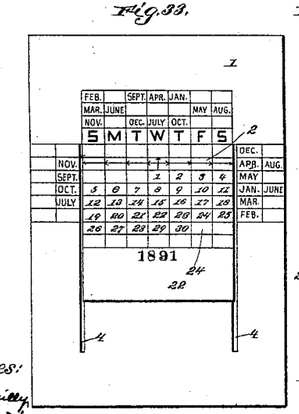
Figs. 33 to 36, inclusive, are respectively a face, end, and side view and a face view of the card-mount alone of one modification.
Figure 34:
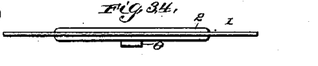

Figs. 30 and 31 are respectively a face and end view of a preferable cheap form of the calendar, and Fig. 32 is a diagram of the date-slip with the month-groups displayed thereon also, so that dates and month-groups move together. In these three figures the number 1 indicates the card or mount, 2 the date-slip, and 6 a projection attached thereto at the back, wherewith to move it. The number 5 indicates a strip of paper or other suitable material having displayed upon its lower edge the initials of the days of the week, and a rectangular opening 8 cut therein of proper dimensions to expose to view one month-group of the date-slip when placed behind it. The strip 5 is secured at the ends to the back of the card, the ends passing through the slots 4. It may, however, be secured to the front of the card, if desirable. The strip 5 covers all of the month-groups but the one group which may be in use as exposed at the opening 8. The date-slip 2 is slid sidewise for setting to the month required in the same manner as described for Figs. 5, 6, and 7, carrying, however, in this case the month-groups with it. The opening 8 in this case subserves the same purpose as the pointer or index in Figs. 5, 6, and 7, the difference being that in the latter case the index is movable with the slip, while the month-groups remain fixed, and in Figs. 30, 31, and 32 the index-opening 8 is stationary, while the month-groups are movable with the date-slip. The projection 6 similarly serves to limit the motion of the slip to the seven places required for the seven days of the week. In this construction, therefore, all necessity for pointers or indices upon the date-slip is avoided and it is only necessary to move the date-slip until the required month appears at the opening 8. It is obvious that in this construction a plurality of month-group series may be displayed in different positions on the date slip or slide and a corresponding plurality of openings 8, properly situated, may be used, in order that the calendar may serve for a plurality of years, without departing from this invention.

Figures 20, 21:
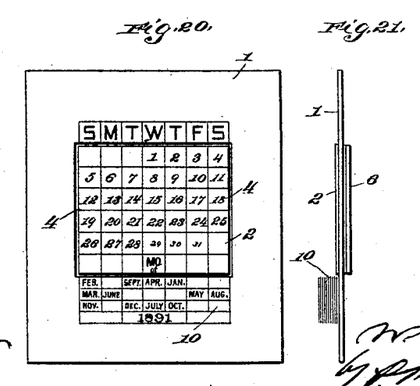
Figs. 20 and 21 are respectively a face view and side view of an application of the invention, showing one method of extending its use into a series of years.
Figure 22:
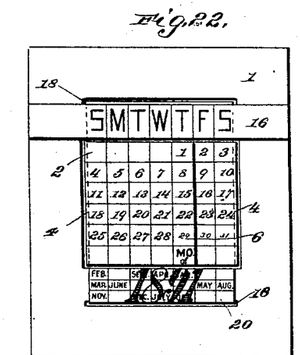
Figs. 22 to 25, inclusive, are respectively a face view, an end view, a side view, and a back view of another application of the invention to a calendar to serve for a series of years.
Figure 23:
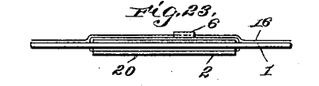
Figure 24:
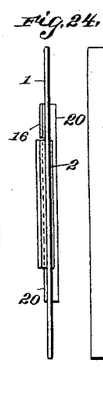
Figures 25, 26:
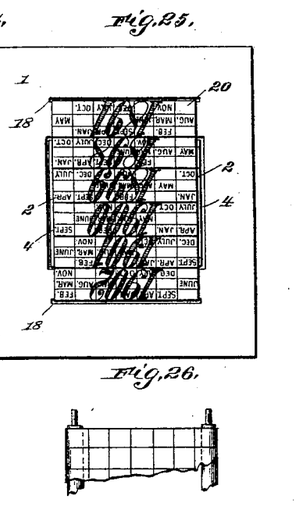
Figs. 26 and 27 show modifications of construction hereinafter described.

In Figs. 20 and 21 the number 1 indicates the card or mount, having the names, initials, or abbreviations of names for the days of the week displayed thereon over the upper ends of slots 4 and a set of month-groups for the last year for which the calendar is to serve at the bottom of these slots. Secured to the card 1 at the upper edges, by stitching, stapling, eyeletting, or any of the well-known means for such purposes, are nine slips 10, each having displayed thereon a set of month-groups for a separate year. These slips are to be removed one for each year after the manner of the ordinary monthly tear-off calendar. In this way the outer strip or leaf 10 has the month-groups upon it for the year 1891, as shown in Fig. 20, the next beneath for the year 1892, and so on until for the tenth year the month-group is displayed upon the card itself, and this simple calendar serves for ten years, and may be constructed to serve for as many years as may be desired. If the month-group slips 10 be secured by their upper edges, as is customary in such constructions for facility of removal, any of these slips remaining may be lifted at the bottom, exposing to view either of the remaining slips, in which way any coming year may be consulted, or these leaves or strips may be placed at the top and hinged to the top edge of the card, so that they may be turned over upon the back of the card as they become obsolete, or they may be placed separately in a pocket formed upon the face of the card, and thus be preserved for reference. In either of the last-mentioned forms, as the leaves or slips may be printed on both sides but one-half the number of leaves will be required. Said month-group slips or leaves may be arranged in many other ways, requiring but one single movement to change from year to year without departing from the gist of this invention. I therefore do not confine myself to the exact arrangement of them shown and described.

Figure 28:
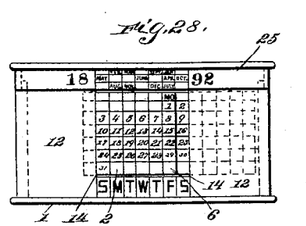
Figs. 28 and 29 are respectively a front and plan view (the latter partly broken away to show the front construction) of the application of the invention to a rectangular box or receptacle having a cover, upon which the month-groupings are displayed and serving for four years.
Figure 29:
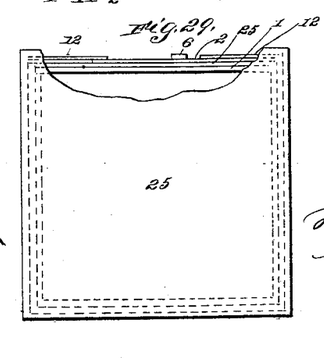

Figs. 28 and 29 represent the application of the invention to a square box or receptacle with a cover which may be placed thereon in four different positions—as, for instance, a pin-box, wafer-box, toilet-box, or a similar receptacle for any purpose of use or ornament. The date-slip and month-groups are in this case shown as for the year "1892," and the four sides of the cover would have displayed thereon the year and the month-groups for three other years in consecutive order, so that each position of the cover sets the calendar for a different year, and either of the four years may be referred to at any time. In Fig. 29 the upper web of the cover is partially broken away to show the construction. In these figures the number 1 indicates the bottom part of the box or receptacle; 2, the date-slip; 6, a projection by which it may be moved, having the central date-column displayed thereon; 25, the cover, and 12 an outer covering on the front having a rectangular opening 14 therein of proper dimensions to expose seven columns of the date-slip and having at its lower edge the names, initials, or abbreviations of names for the days of the week displayed thereon. The date-slip slides between the body of the receptacle 1 and the outer face covering 12. In this way a hexagonal article may be made to serve for six years and an octagonal one for eight years, &c.

Figure 27:
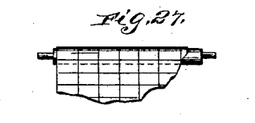

Figs. 22 to 25, inclusive, show a cheap construction arranged to serve for twelve years. In these figures the number 1 indicates the card or mount; 2, the date-slip passing through slots 4 and united at the back into an endless web, as described, for the other similar constructions, and having a projection 6 for moving it at the front, with the central column of date-numbers displayed thereon, as well as the index abbreviation "Mo. of." A strip of paper or other suitable material 16 is secured at its ends beyond the slots 4 to the card 1 and having displayed thereon the names, initials, or abbreviations of names of the days of the week. Two slots 18 are cut in the card 1 at right angles to the slots 4. A strip of paper or other suitable material 20 passes through the slots 18 and is united at the back into an endless web in a similar manner to the web 2, and has displayed thereon the years and corresponding month-groups for twelve years. On the front of the card 1 the month-group web 20 passes under the date-slip 2 and the week-day slip 16 and is hidden thereby, except at the bottom, beyond the date-slip 2, where the proper width is exposed to view for one month-group. On the back the month-group web 20 passes outside of the date-slip 2, so that this part of the web 20 may be accessible for moving it. The figures for the year are printed over the abbreviations in the month-groups to economize space and are preferably displayed in a separate color, so as not to obscure the month-groups. In this construction by moving the month-group web 20 one place for each year the calendar may serve for twelve years or for as many years as there are month-groups displayed upon it, and any year provided for may be consulted either backward or forward at any time by putting the web 20 in place to exhibit the month-group for the required year at the front. As a more expensive construction of the forms heretofore described, having endless-date or month-group webs, and to avoid the friction incident to moving the webs around the edges of the slots in the cards, small rollers, as shown in Figs. 26 and 27, may be placed near the slots properly journaled on the card in any well-known way, over which the web or webs may run.

For the cheapest constructions the endless-date or month-group webs may be made of a tough paper, particularly if constructed for one year only, in which latter form it will be preferable to construct the cheaper kinds; but for more elaborate and expensive kinds, or those designed to serve for a series of years, these webs are preferably made of some textile material, and for the most expensive and ornamental kinds the preferable material is silk. In those constructions in which the date-slip 2 is in the form of a flat slide instead of an endless web the preferable material is thin card-board.

In those constructions in which the date-slip is in the form of an endless web joined at the back of the card said slip is shown as having a projection of card-board or similar material, by means of which it is moved. It may, however, when made of textile material be sewed or stitched together at the back, leaving the ends of the web to project sufficiently to serve as a means of moving it. In the latter case such web ends, being flexible, will lie close to the card and form no obstruction to hanging the calendar against a wall or other flat surface. In this case, also, the joined ends of the web may be made to pass through the slots 4 in the card, bringing the joined part of the web to the front, which latter arrangement will permit of a card or mount being printed on both sides with month-groups and week-day exponents, and thus a plain card with a single web be made to serve for two years, or if month-groups be placed both at top and bottom or both sides of the card such a construction would serve for four years, the entire calendar consisting of but two pieces. I therefore do not confine myself to the means shown and described for joining the web or for moving the same.

In all the figures heretofore described and in the Diagrams 11 to 15, inclusive, the date-slip has displayed thereon sufficient numbers to exhibit thirty-one dates for every month. As, however, February has but twenty-eight days, and in leap-years twenty-nine, and April, June, September, and November thirty days, it is only necessary to display the dates "29," "30," and "31" of each month in some form, color, or size distinct from the rest to call the observer's attention to the use of the proper number of days only at or near the end of the month in the same way as explained in my application filed herewith, Serial No. 387,710, (Case G.) For this purpose the numbers "29," "30," and "31" are all shown in the heretofore-described constructions as smaller than the others. As, however, for some purposes it may be desirable to avoid having any more dates exposed to view than properly belong to a given month, Figs. 33 to 36, inclusive, show one modification in which the number of dates only are exposed as belonging to any month.

Figures 35, 36:
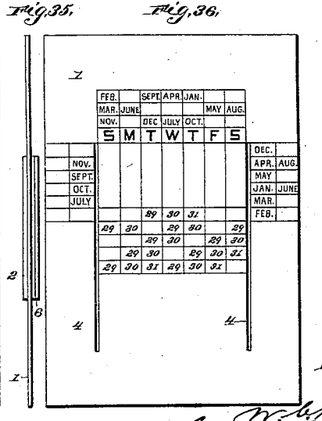
Figure 37:
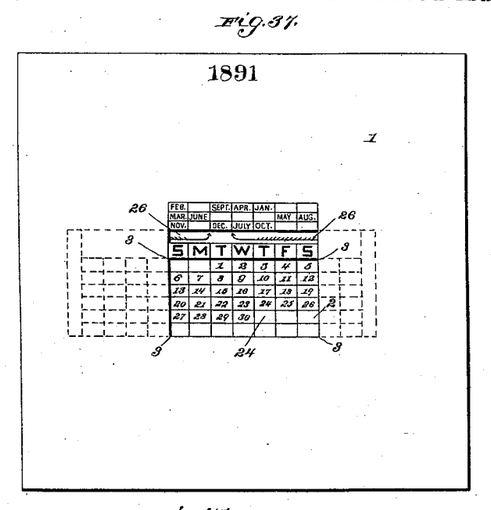
Figs. 37 to 41, the several views of another modification, both hereinafter described.
Figure 38:
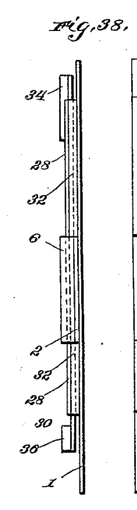

In Figs. 33 to 36 the number 1 indicates the card or mount, 2 the endless date-web, and 6 the projection for moving it. The date-web 2 in this case has a rectangular opening 24 cut in it, where otherwise would appear in regular order the numbers "29," "30," and "31." In the card 1 are cut two slots 4, longer than the width of the date-web 2, to permit of the web being slid vertically on the card 1, as well as laterally through the slots 4. The date-slip 2 is also made wider than required for the six horizontal rows of dates, a portion of which extra width is occupied at the top by a horizontal pointer and a vertical pointer, and a portion blank at the bottom, upon which may be displayed the figures for the year or any other desired matter. On the card 1, over the top ends of the slots 4, are displayed the initials of the days of the week, and over these the month-groups. At the sides, outside of the slots 4, are also displayed other months or groups of months properly placed for indication by the horizontal pointers on the date-web 2. Lower down on the central part of the card 1, as shown in Fig. 36, are displayed the numbers "29," "30," and "31" in groups and partial groups, so that for a given vertical and horizontal position of the date-web 2, as directed by placing the vertical pointer at the proper month-group at the top and the horizontal pointer at the proper month or group at the side, the proper numbers will appear at the opening 24 in the date-web 2 for the month indicated by both pointers. Thus to place the calendar for the month of April, as shown in the figures, the horizontal pointer is set to point to April in the right-hand column of months and the vertical pointer at the same month at the top, and the terminal numbers "29" and "30" will appear in the opening 24 of the date-web. As the several sets of month-groups and the several sets of terminal date-numbers would have to be changed for every year, this modification will be preferably constructed to serve for but one year.

Figures 39, 40, 41:
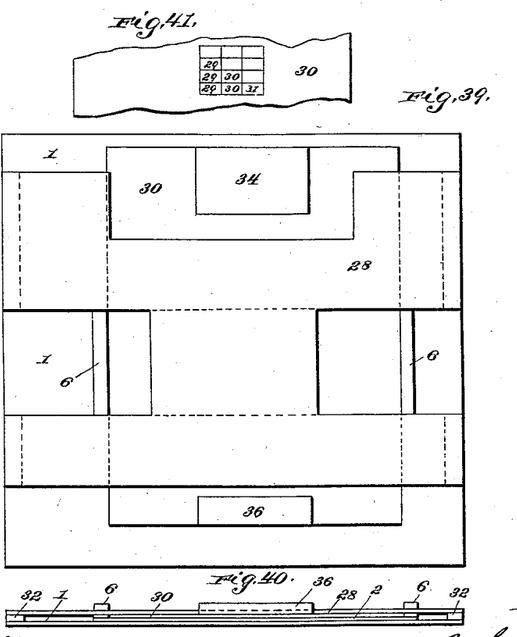

In Figs. 37 to 41, inclusive, the number 1 indicates the card or mount, having cut therein a rectangular opening 3 of the proper dimensions to expose to view seven of the vertical date-columns of the date slip or slide 2 and a narrow horizontal opening 26, wide enough to expose to view any suitable pointer or index which is displayed upon the upper edge of the date-slide 2—in this case two arrows. On the strip between the two openings in the card 1 are displayed the abbreviations of the days of the week and above the narrow opening 26 the month-groups, to which the pointers on the date-slide are directed. Attached to said date-slide, at the back, are projections 6 for moving it, the ends of which also serve as guides against the edges of the recesses cut in the overlapping back piece 28. The date-slide has an opening 24 cut in it, where the numbers "29," "30," and "31" would otherwise come. Between the back piece 28 and the date-slide 2 is a vertical slide 30, guided between the projections 6 and moving laterally with said date-slide. The vertical slide 30 has displayed upon its front side a group of date-numbers in four horizontal rows, consisting of a blank row at the top, the number "29" in the next below at the left, "29" and "30" next below, beginning at the left, and "29," "30," and "31" in the bottom row, as shown in Fig. 41, the card 1 being here broken away to show a broken part of the slide 30, brought down to this place for this purpose. The slide 30 moves vertically upon the back of the slide 2, and the whole is held in place by the back piece 28, which is secured to the card 1 at the side edges by separating-blocks 32. Besides the horizontal central recesses in the back 28 for guiding the date-slide 2, a recess is cut in its upper edge, and attached to the top of the vertical slide 30 is a projecting block 34, by means of which it may be moved, and by contact with the back 28 limits its lower position, and attached to the lower end of the slide 30 is a projecting block 36, which by contact with the lower edge of the back 28 limits its upper extreme position. To set this modification, the date-slide 2 is moved until the pointer indicates the proper month, and if February (not in leap year) place the vertical slide in the lowest position, when the opening 24 in the date-slide will exhibit a blank and "28" be the terminal date. If for February in a leap-year, the number "29" will be set to appear at the opening 24. If for a thirty-day month, the slide 30 is set to expose the numbers "29" and "30" at the opening 24, and if for a thirty-one-day month the slide 30 is placed at its upper limit and "29," "30," and "31" will appear at the opening 24. In this construction it is obvious that the calendar may be constructed to serve for any number of years desired by superimposing any number of the proper month-groups upon the card 1 in the same manner as described for Figs. 20 and 21. In any of the kinds described, where most desirable to have the row of week-day exponents below the date-slide, as in Figs. 5 and 28, it is obvious that the numbers in the date-slide may be made to read—to increase by sevens—upward, or to increase by units to the left in the horizontal rows, instead of as shown and described, without departing from this invention.

It is obvious that in any of the forms shown the series of month-groups may be made to include in a series for a given year one or more of the months of the preceding or succeeding year, or both, so that reference may be made to such months at or near the beginning or end of the given year. I therefore do not confine myself to a series of month-groups constituting the months of a single year only.

In the forms shown, in which the date-slip is used as a flat slide, the cards upon which they are mounted require a considerable width of margin beyond the opening exposing the calendar-table in order to conceal that part of the date-slip not visible at any time, and this feature offers excellent opportunity for advertising or ornamental purposes on the wide margins thus provided.

It is obvious that in the application of the principles of this invention the construction may be greatly varied, and the date-slip may be made to read and move vertically instead of horizontally, if preferred. It is also obvious that it may be applied to numerous objects of use or ornament not specifically herein shown and described all without departing from the gist of the invention. I therefore do not confine myself to the specific constructions of the invention or to its application to the articles of use or ornament specifically shown and described; but,

Having thus fully described my said invention, I claim—

1. In a calendar, a movable web or slide of paper or other suitable material having printed or otherwise displayed thereon thirteen columns of date-numbers disposed so that any seven consecutive columns shall contain all the dates necessary and in the proper order for a calendar-table for one month, in combination with a card or mount having displayed on one or both sides one or more rows of the names or abbreviations of names of the days of the week, said card also having displayed thereon or conjoined therewith a plurality of series of names of the months, each series containing seven groups of said months and having displayed thereon, also, the number of the year for which the series is to serve, whereby said calendar may be made to serve for as many years as there are separate series of month-groups and their accompanying year-numbers provided, substantially as set forth.

2. In a calendar, the combination of a slotted or recessed card or mount having displayed on one or both sides or conjoined therewith one or more series of seven groups of the names or abbreviations of names of the months and one or more rows of the names or abbreviations of names of the days of the week, and an endless web of paper or other suitable material passing through said slots or recesses in said card, having displayed thereon thirteen columns of date-numbers disposed so that any group of seven consecutive columns shall contain all the dates necessary and in the proper order for a calendar-table for one month, substantially as set forth.

3. In a calendar, a movable web or slide of paper or other suitable material having displayed thereon thirteen columns of date-numbers disposed so that any group of seven consecutive columns shall contain all the dates necessary and in the proper order for a calendar-table for one month, and having also displayed thereon one or more series of seven groups of the names or abbreviations of names of the months, in combination with a card or mount having displayed thereon one or more rows of names or abbreviations of names of the days of the week, said card being constructed to expose to view any seven consecutive columns of figures on said web or slide, and containing one or more openings of proper dimensions and suitably placed to expose to view through each of said openings one of each of said month-groups for each of the seven positions of said slide or web, substantially as set forth.

4. In a calendar, a strip of paper or other suitable material having displayed thereon a table of date-numbers in thirteen vertical columns or rows and in six or more horizontal rows, said date-numbers in each vertical column or row increasing downward by sevens and in the horizontal rows increasing to the right by units from any given number, said slip also having displayed thereon a series of seven groups of the names or abbreviations of names of the months arranged so that the months having corresponding dates falling on the same day of the week for any given year shall be in the same group, substantially as and for the purposes set forth.

5. In a calendar, a movable web or slide of paper or other suitable material having printed or otherwise displayed thereon thirteen columns of date-numbers disposed so that any group of seven consecutive columns shall contain all the dates necessary and in the proper order for a calendar of one month, said slide also having displayed thereon a series of seven groups of the names or abbreviations of names of the months set opposite or in line with the central seven of said thirteen date-columns, said month-groups being arranged so that the months having corresponding dates falling on the same day of the week shall be in the same group, in combination with a card or mount having displayed thereon a row of the names or abbreviations of names of the days of the week set to fall in line with any seven of said date-columns upon said movable web or slide, substantially as and for the purposes set forth.

6. In a calendar, a movable web or slide of paper or other suitable material having printed or otherwise displayed thereon thirteen columns of date-numbers disposed so that any group of seven consecutive columns shall contain all the dates necessary and in the proper order for a calendar of one month, and having also displayed thereon a series of seven groups of the names or abbreviations of names of the months, said month-groups being arranged so that the months having corresponding dates falling on the same day of the week for any given year shall be in the same group, in combination with a card or other suitable mount having an opening therein of proper dimensions to expose to view seven of said date-columns of said date web or slide and having displayed thereon a row of the names or abbreviations of names of the days of the week set opposite the places of said seven date-columns, and a covering-strip secured at the ends to said card or mount set to cover all seven of said month-groups displayed on said movable date-slide, except one, and having a suitable opening therein to expose to view a month-group, substantially as and for the purposes set forth.

7. In a calendar, an endless movable web or slide of paper or other suitable material having printed or otherwise displayed thereon thirteen columns of date-numbers disposed so that any group of seven consecutive columns shall contain all the dates necessary and in the proper order for a calendar of one month, said web also having displayed thereon a series of seven groups of the names or abbreviations of names of the months arranged so that the months having corresponding dates falling on the same day of the week shall be in the same group, in combination with a card or mount having slots cut therein for the reception of said web at the proper distance apart to expose to view at the front of said card seven of said thirteen columns and conceal at the back of said card the remaining six, and a covering-strip secured to said card at its ends, arranged to conceal all said month-groups, except one, and having an opening therein of proper dimensions to expose to view one only of the said month-groups, said covering-slip having displayed thereon a row of the names or abbreviations of names of the days of the week set in line with the seven date-columns exposed, substantially as and for the purposes set forth.

8. In a calendar, a movable web or slide of paper or other suitable material having printed or otherwise displayed thereon thirteen columns of date-numbers disposed so that any group of seven consecutive columns shall contain all the dates necessary and in the proper order for a calendar of one month, said date-slide having an opening where the numbers "29," "30," and "31" would otherwise appear in regular order, in combination with a card or other suitable mount arranged with an opening to expose to view seven of said date-columns, and an auxiliary slide made to move at right angles to said date-slide, having displayed thereon four rows, one blank row, one row containing at the left hand the number "29," one row with the numbers "29" and "30," beginning at the left hand, and one row with the numbers "29," "30," and "31," all placed on said auxiliary slide, so that by properly placing said slide for the several months the proper terminal numbers for a given month will appear at the opening in said date-slide, substantially as and for the purposes set forth.

9. In a calendar, an endless movable web or slide of paper or other suitable material having printed or otherwise displayed thereon thirteen columns of date-numbers disposed so that any group of seven consecutive columns shall contain all the dates necessary and in the proper order for a calendar of one month, and having an opening therein, where the numbers "29," "30," and "31" would otherwise come in regular order, and vertical and horizontal pointers on its upper edge, in combination with a card having two parallel slots cut therein to receive said endless web at the proper distance apart to expose to view on the front of said card seven of said date-columns, said card having displayed thereon a row of names or abbreviations of names of the days of the week, a series of seven groups of the names or abbreviations of names of the months arranged to come in line with the seven date-columns exposed to view, a second series of month-groups, and suitable groups or partial groups of the numbers "29," "30," and "31," substantially as and for the purposes set forth.

10. In a calendar designed to serve for a plurality of years, a movable date-slide having date-numbers displayed thereon mounted to move upon one member of any separate article of use or ornament suitable therefor, said member having displayed thereon a fixed row of the names or abbreviations of names of the days of the week set opposite the place of exposure of said dates, and the other member of said separable article having displayed thereon a corresponding plurality of series of seven groups of the names or abbreviations of names of the months and year-numbers, so that by changing the position of one member of said separable article upon the other member for each year the calendar mounted thereon may serve for as many years as there are separate series of seven month-groups and year-numbers, substantially as and for the purposes set forth.

11. In a calendar designed to serve for a plurality of years, a movable endless date web or slip having date-numbers displayed thereon and mounted upon and passing through two parallel slots in a card or mount, said card or mount having a fixed row of the names or abbreviations of names of the days of the week displayed thereon and set opposite the area of exposure of said dates, in combination with a slip or slips of paper or other suitable material mounted upon said card and having displayed thereon a corresponding plurality of series of seven groups of the names or abbreviations of names of the months and the year-numbers, substantially as and for the purposes set forth.

12. In a calendar designed to serve for a plurality of years, a movable endless date web or slip having date-numbers displayed thereon and mounted upon and passing through two parallel slots in a card or mount, said card or mount having a fixed row of the names or abbreviations of names of the days of the week displayed thereon and set opposite the area of exposure of said dates, in combination with slips of paper or other suitable material, each having displayed thereon a series of seven groups of the names or abbreviations of names of the months and the year-numbers, said slips being superimposed upon said card or mount opposite said area of exposure, so as to permit of their being changed or removed as required for a change of year, substantially as and for the purposes set forth.

13. In a calendar designed to serve for a plurality of years, a movable date-slide having displayed thereon date-numbers and mounted to slide upon the back of a card or mount having an opening therein of the proper dimensions to expose to view the dates for one month, said card or mount having displayed thereon a fixed row of the names, initials, or abbreviations of names of the days of the week set opposite the place of exposure of said dates, in combination with a slip or slips of paper or other suitable material mounted upon said card and having displayed thereon a corresponding plurality of series of seven groups of the names or abbreviations of names of the months and the year-numbers, substantially as and for the purposes set forth.

WM. C. HAWKINS.

Witnesses:
THEO. H. FRIEND,
P. R. VOORHEES.